Aug. 22, 1967  F. HEYDENREICH  3,336,670
DENTAL APPARATUS FOR MEASURING AND EVALUATING
MOUTH MEASUREMENTS FOR TOOTH PROTHESES
Filed Dec. 31, 1963  2 Sheets-Sheet 1
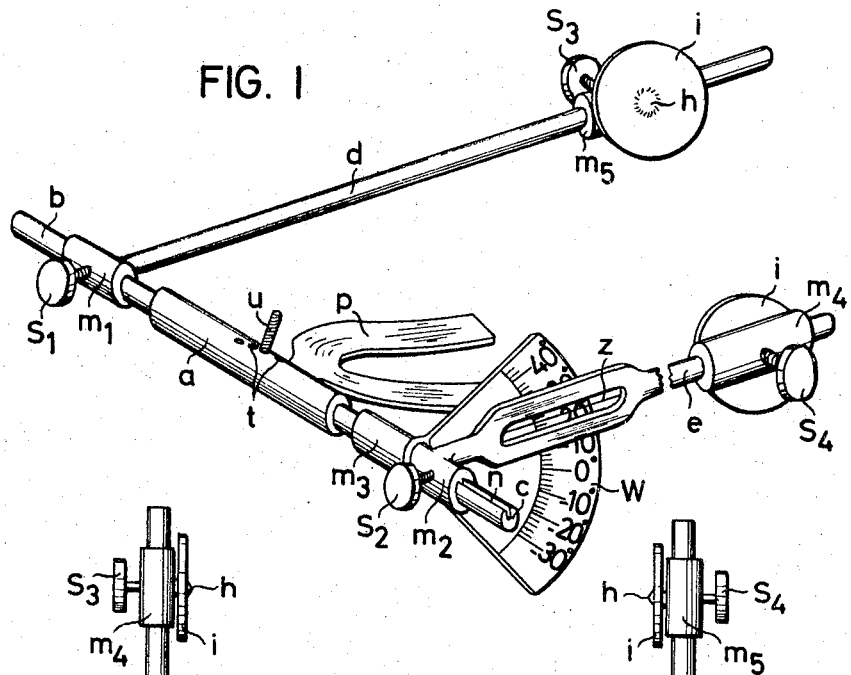
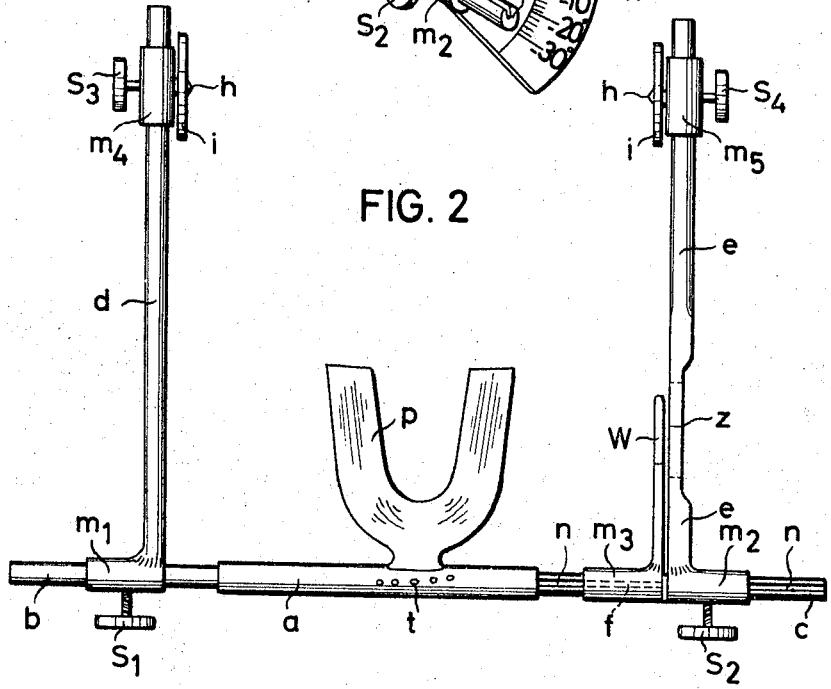
INVENTOR.
FRIEDERIKE HEYDENREICH
BY
McGlew and Toren
ATTORNEYS

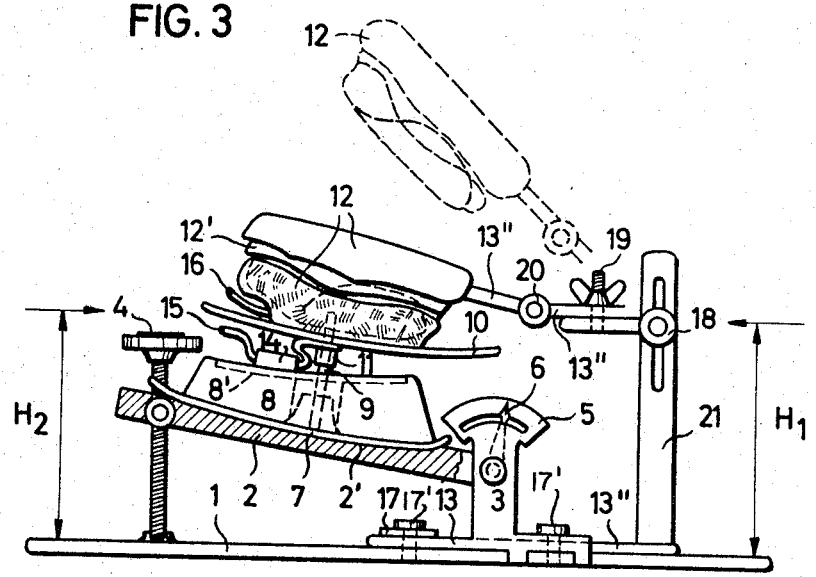
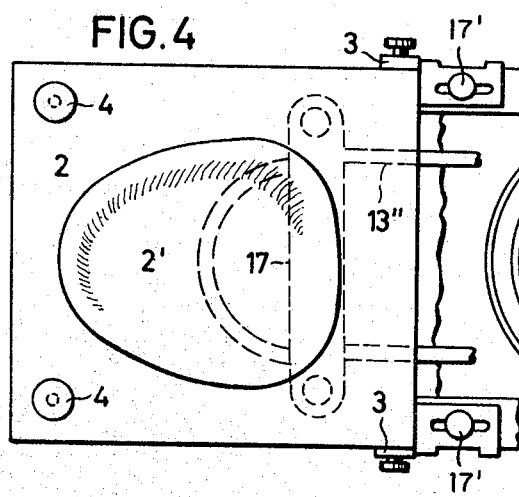
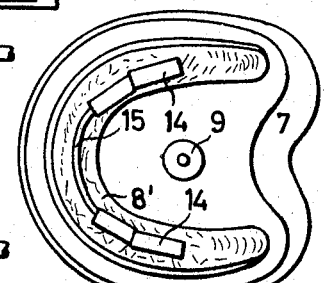
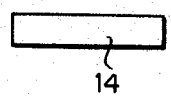
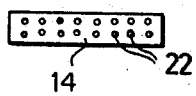

United States Patent Office

3,336,670
Patented Aug. 22, 1967

3,336,670
DENTAL APPARATUS FOR MEASURING AND
EVALUATING MOUTH MEASUREMENTS FOR
TOOTH PROTHESES
Friederike Heydenreich, Lazarettstrasse 3,
Garmisch-Partenkirchen, Germany
Filed Dec. 31, 1963, Ser. No. 334,863
13 Claims. (Cl. 32—32)

This invention relates to the measurement and evaluation of mouth dimensions for tooth protheses and, more particularly, to a novel combination of a novel measuring device for measuring the mouth dimensions and a novel evaluating articulator for evaluating the measurements obtained from the measuring device.

Instruments hitherto used for measuring bite molds and protheses have usually been designed in the nature of scissors for articulation about a fixed pivot, and thus have been unable to take into account the pivotal point or condyle about which occurs the natural motions of the mandibles. For example, the upper and lower jaws are not pivoted about a fixed point, but their point of pivotal interconnection provides for some lateral relative displacement as well as for some longitudinal relative displacement.

An object of the present invention is to provide apparatus for determining the exact position of the so-called occlusion plane and of the angular relation of the articulator plane with respect thereto, as well as to determine the relative position of the pivotal points or condyles in the patient's head.

Another object of the invention is to determine these positions and angular relationships with the aid of a measuring device and then to transfer the measured values thus obtained to a simple articulator.

A further object of the invention is to provide an articulator for use with the measuring instrument and designed so that individual masticatory motions can be precisely imitated so that a faultless occlusion plane can be determined, or impressed.

For an understanding of the present invention, reference is made to the following description of a typical embodiment thereof as illustrated in the accompanying drawings.

In the drawings:

FIG. 1 is a perspective view of the measuring device;

FIG. 2 is a plan view thereof;

FIG. 3 is a side elevation view, partly in longitudinal section, of the articulator;

FIG. 4 is a plan view of a part of the apparatus shown in FIG. 3;

FIG. 5 is a top plan view of a mandible model; and

FIGS. 6a and 6b are, respectively, front and rear elevation views of a small plastic piece useable with the apparatus of FIGS. 3, 4 and 5.

Referring first to the measuring device shown in FIGS. 1 and 2, this device is intended to be positioned on the head of the patient to determine the occlusion plane, the articular plane, the angle therebetween, and the relative position of the condyles. As illustrated in FIGS. 1 and 2, the measuring device includes a relatively rigid cross bar or cross shaft $a$ having reduced ends $b$ and $c$. Elongated arms $d$ and $e$ are formed at one end with sleeves $m_1$ and $m_2$, respectively, telescoped over the reduced ends $b$ and $c$, respectively, of the cross shaft $a$. The rods $d$ and $e$ can be locked in a desired angular relationship on cross shaft $a$ by means of knurled head set screws $s_1$ and $s_2$.

A goniometer support sleeve $m_3$ is telescoped over the reduced end $c$ of cross shaft $a$ and inwardly of the sleeve $m_2$. Reduced end $c$ is formed with a longitudinally extending groove $n$ in which is engaged a spring $f$ secured to the interior surface of the sleeve $m_3$. By means of the interengagement of spring $f$ in the groove $n$, a goniometer W having the support sleeve $m_3$ can be secured against angular movement relative to cross shaft $a$, but can be adjusted longitudinally of reduced end $c$ of the cross shaft. Securing means for locking goniometer W at a longitudinally adjusted position along reduced shaft end $c$ is not necessary because the friction will suffice to maintain sleeve $m_3$ at any adjusted longitudinal position, especially as the friction is accentuated by spring $f$ engaging in groove $n$.

Goniometer W is in the form of a protractor scale which may extend through, for example, about 90°, the protractor scale being graduated in degrees and minutes both positive and negative with respect to a reference graduation "0°." The angle between the occlusion plane and the articulator plane is determined by a cross hair or wire $z$ extending longitudinally and centrally of a recess in a laterally enlarged portion of the rod $e$. Cross hair $z$ enables accurate reading of the angle measured by goniometer W.

An occlusion plate $p$ for determining the occlusion plane is mounted rigidly on cross bar $a$, but can be interchanged with occlusion plates of various sizes. Plate $p$ can also be designed as a holder for articulating paper in the calotte-shaped plate curvature for grinding the teeth in the mouth. Goniometer W and plate $p$ are so adjusted relative to shaft $a$ that the "0" graduation of the goniometer coincides with the symmetry axis of plate $p$, which is the so-called occlusion plane.

Sleeves $m_4$ and $m_5$ are longitudinally and angularly adjustably mounted on rods $e$ and $d$, respectively, and are retained in adjusted position by set screws $s_3$ and $s_4$. These sleeves support disks $i$ which have protuberances $h$ on their exposed or inner surfaces. These protrusions are arranged to contact the so-called condyles when the measuring device is in use.

To use the measuring device, the set screws $s_1$, $s_2$, $s_3$ and $s_4$ are loosened and occlusion plate $p$ is positioned in the patient's mouth. The arms $d$ and $e$, and the sleeves $m_4$ and $m_5$, are then adjusted, relative to cross shaft $a$ or relative to rods $d$ and $e$, respectively, until the protuberances $h$ are in contact with the condyles. The set screws $s_1$, $s_2$, $s_3$ and $s_4$ are then tightened, and the position of cross hair $z$ along the scale of goniometer W can be read. In the illustration of FIGS. 1 and 2, this angle is indicated as substantially 20°. The rods $d$ and $e$ define the so-called articular plane, and the measured angle corresponds to the angle between the articular plane and the occlusion plane. This angle, as well as the distance along longitudinal rods $d$ and $e$ measured from the intersection of plate $p$ with cross rod $a$ to the condyle locators $h$ furnishes the exact distance from the front incisor edges to the condyles. For accurate measurements, the rods $d$ and $e$ may be suitably graduated in inches or millimeters. The measured angle and the measured distances may then be transferred to the articulator described hereinafter.

Several holes $t$ can be drilled in cross bar $a$ at the position of the plate $p$, and these holes are positioned between 70° and 90° with reference to the facial angle and with respect to the occlusion plate $p$. Micrometer pins $\mu$, each having a scale subdivided into millimeters, can be inserted into the holes $t$ to measure the distance from fold to fold in order to determine the normal height of the row of teeth.

It will be appreciated that the protuberances $h$ and their support disks could be replaced by means for suspending the measuring device from the auditory passages of the patient, or by a suspension device around the auricles as is customary in the case of spectacle frames. The goniometer W can be mounted on either one or both of the rods *d* or *e*, and the cross hair *z* could be associated with either one or both of the sleeves $m_1$ and $m_2$. In case of a single goniometer, this could be interchanged between the reduced ends *b* and *c* of the measuring device as desired, and in such instance, the reduced end *b* would likewise have a groove formed longitudinally thereof, and in alignment with the groove *n*. It will be further appreciated that the rod *d* could be mounted fixedly on the reduced end or cross bar *b*, and the occlusion plate *p*, the goniometer W or its sleeve $m_3$, and the longitudinal rod *e*, could be arranged to be shifted lengthwise or axially of the cross shaft and locked in position.

The articulator for evaluating the measurements obtained with the measuring device of FIGS. 1 and 2 is illustrated in FIGS. 3–6*b*. Referring to these figures, the articulator includes a base plate or base 1 having a lower support or plate 2, of glass, transparent plastic or some other suitable material, mounted, in spaced relation to base 1, by means of bearings 3. These bearings 3, as best seen in FIG. 4, may be arranged to be adjustable longitudinally of base 1 as well as to be clamped in fixed longitudinally adjusted position. Bearings 3 are mounted on uprights of a slide 13 which has two laterally spaced legs each of which is formed with a longitudinal slot. Each of these slots receives a bolt or stud 17' engaged in base plate 1. By loosening bolts 17', slide 13 can be adjusted longitudinally of base plate 1, thus effecting longitudinal adjustment of bearings 3. The bearings can be fixed in longitudinally adjusted position by re-tightening bolts or studs 17'. A scale or goniometer means 5 is provided at one of the bearings in order to set the angle between the occlusion and articular planes, in accordance with the measurement obtained on the goniometer W of FIGS. 1 and 2. This setting of the angle is effected with the aid of a pointer 6 movable with lower support 2 about the axis of bearings 3.

In the illustrated example, a trough 2' is formed in an upper surface of lower support 2, and a brain-pan plate 7 is loosely set into this trough. A mandible model 8 carrying a lower bite mold 8' is mounted on calotte-shaped plate 7 rather than on the lower support of the articulator, as has been customary in prior instruments. A bolt 9 extends outwardly from calotte-shaped plate 7, and an intermediate plate 10 can be adjustably positioned along bolt 9 by means of a nut 11. Intermediate plate 10 should be transparent and made of suitable material which is as clear as glass, such as a suitable transparent plastic material. Plate 10 supports the maxilla model 12 with its upper occlusion mold 12'. Maxilla model 12 is mounted on the articulator beam 13'', which is a two-part beam whose parts are hingedly interconnected at 20. The hinged interconnection provides for swinging of maxilla model 12. Further adjustment is provided by a set screw arrangement 19 securing beam 13'' to a horizontal arm extending from upright 21, this set screw means providing for relative swinging of beam 13' in a horizontal plane, and thus providing a further swiveling adjustment of maxilla model 12. The position can be locked by tightening of the set screw means 19.

Between the adjustably mounted lower mandible model 8 and the fixed maxilla model 12, small plates or leaf springs 14, of suitable plastic material, such as shown in FIGS. 6*a* and 6*b*, are positioned in wax for the purpose of keeping both occlusion molds 8' and 12' under pressure in the mouth during the counter bite. These parts shown in FIGS. 6*a* and 6*b* are relatively resilient. These facilitate the taking of the occlusion, which is very difficult, and make possible the accurate carrying out of the occlusion measurement. The small plates shown in FIGS. 6*a* and 6*b* may have nipples or burls 22 on their undersides so that they may rest on the waxen base without shifting.

The spring pressure to hold the occlusion molds 8' and 12' under pressure when the patient closes his or her mouth, so as to facilitate the difficult occlusion bite and to fix it exactly according to the respective formations of the jaws, may be provided in various manners. In the illustrated example, a leaf spring 14 is mounted in each lateral tooth area on the lower occlusion mold 8', as by having an end engaged in a manipulating handle 15 provided to facilitate removal of the mold 8', as by grasping the handle 15 manually or with pliers. The bottom of the corresponding occlusion mold at the height of the tooth row 12 may be formed with an appropriate sliding surface for engaging the handle 15, although this has not been illustrated. It will be noted that there is also provided a freely accessible handle 16 for mounting leaf springs or plates associated with the upper occlusion mold 12'.

The open space between base 1 and lower support 2 permits exchangeable and adjustable storage of articulator beams 13''. For example, these may be stored by means of a cross bar 17, held by studs 17', which will clamp the legs 13'' in position so that various articulator beams are readily accessible for interchange with each other.

As has been mentioned, the apparatus of the present invention solves the problem of making the occlusion mold and of precise placement of the teeth according to the natural position of the original set of teeth. For this purpose, the apparatus is used in the following manner.

In a first step, the angle between the occlusion and articulator planes is determined at the patient's head by using the measuring device of FIGS. 1 and 2, and this device is also used to determine the distance of the lower front incisor edges from the condyles by reading, along the rods *d* and *e*, the adjusted position of the condyle locators *h*. In the next step, lower support 2 of FIGS. 3, 4 and 5 is adjusted, by means of the screws 4, so that pointer 6 with reference to its associated scale of goniometer means 5 indicates the measured angle as measured by goniometer W. Next, by virtue of the adjustment means 18 provided in the upwardly extending support 21 for the articulator beam, the pivot axis 18 is adjusted so that the planed incisor edge of the front row of incisors and the pivotal axis 18 are located in the same horizontal plane, as indicated by the horizontal arrows at the heights $H_2$ and $H_1$ in FIG. 3. This adjustment is accomplished in such a manner that the plumb distance $H_1$ from pivotal axis 18 to base 1 has the same value as the plumb distance $H_2$ of the incisor edges from the base 1.

Then the mandible model 12 is fixed to articluator beam 13'' in the usual manner, to support the upper occlusion mold 12'. It is advisable to have adjustment provided between model 12 and the support of beam 13'' so that model 12 may be adjusted longitudinally in a direction perpendicular to axis 18. Such adjustment can be provided, as mentioned, by a thumb screw 19 engaged through slots in the beam 13'' and the horizontal support extending from the axis 18. However, it is important that the vertical position of axis 18, when once established, must not be changed during any one operation.

Then, after a first preliminary occlusion bite in the mouth, molds 8' and 12' are inserted into the articulator along with the calotte-shaped plate 7. It is possible to align the occlusion molds precisely with respect to each other through the parallel intermediate plate 10 so that an exact final occlusion can be taken. Since plate 10 is transparent, the alveolar crest lines can be marked on the model for viewing from the top, as with a wax plane, in order to avoid erroneous positioning of the teeth and in order to make easy removal of the plate possible. The placement in the hand will be particularly clear if this is done. During placement of auxiliary plates 7 and 10, the latter are simply placed over the models without any guiding and without the bent calotte shape, but supported in parallel relation to models 8 and 12. Following, this, relative sliding of the lower model 8 with respect to the fixed upper model 12 can be effected, and this motion is equal to the physiological muscle movement of the mandible which is very important in all dental work for an exact grinding of the teeth, but hitherto and has not been possible.

The base plate 2 does not have to have a trough 2' formed therein, but could have its upper surface substantially planar. In such case, a third plate must be used and fitted to the curvature of the calotte-shaped plate 7. Furthermore, both molds can be pressed against the walls during occlusion in the mouth with the aid of a leaf-spring which is inserted between the dentures in the front portion of the mouth. The effect is that the mandible is guided without force in its normal rest position. In place of the spring, forceps could be inserted between the occlusion molds in the front portion of the mouth.

While a specific embodiment of the invention has been shown and described in detail to illustrate the application of the principles of the invention, it will be understood that the invention may be embodied otherwise without departing from such principles.

What is claimed is:

1. Dental apparatus for adjusting bite patterns and protheses comprising, in combination, a base; a lower support plate mounted on said base for angular adjustment about a normally horizontal axis; means operatively associated with said base and said lower support plate to retain said lower support plate in its angularly adjusted position; a calotte plate loosely slidable on said lower support plate; a mandible model fixedly secured to said calotte plate; an intermediate plate secured on said mandible model; an upper support spaced above said lower support; support means mounting said upper support for substantially vertical adjustment relative to said base; an articulator beam mounted on said upper support and including a support portion angularly adjustable about a horizontal axis elevated above said base; means providing adjustment of said articulator beam relative to said upper support and perpendicular to said last-named horizontal axis; said intermediate plate providing a support surface for adjustment of a maxilla model positioned on the support portion of said articulator beam.

2. Dental apparatus, as claimed in claim 1, including spring means positioned at several locations on the upper surface of said mandible model.

3. Dental apparatus, as claimed in claim 1, including stirrup means projecting from at least one of said models adjacent the front tooth region thereof, for grasping by a holding tool.

4. Dental apparatus, as claimed in claim 1, in which the upper surface of said lower support plate has a trough conforming to the curvature of said calotte-shape plate.

5. Dental apparatus, as claimed in claim 1, including a wax base of said mandible model, and resilient means disposed between said wax base and said intermediate plate.

6. Dental apparatus, as claimed in claim 1, including spring means interposed between said mandible model and said intermediate plate.

7. Dental apparatus, as claimed in claim 1, in which said intermediate plate is formed of clear transparent material.

8. Dental apparatus, as claimed in claim 1, including a bolt extending upwardly from said mandible model, and means adjustably locking said intermediate plate in a selected position on said bolt.

9. Dental apparatus, as claimed in claim 1, in which said lower support plate is spaced at a distance from said base, and a support for interchangeable articulator beams positioned in the space between said base and said lower support.

10. Dental apparatus, as claimed in claim 9, including a cross bar associated with said support means for clamping said interchangeable articulator beams to said base.

11. Dental apparatus, as claimed in claim 1, in which said lower support plate is mounted on said base for rotational movement relative thereto, longitudinal adjustment thereto and locking in adjusted position.

12. Dental apparatus, as claimed in claim 1, including relatively adjustable screw and nut means extending between said base and the free end of said lower support plate for effecting angular adjustment of the latter relative to said base.

13. Dental apparatus, as claimed in claim 1, including a second calotte-shape plate interposed between the first-mentioned calotte-shape plate and said lower support plate.

References Cited
UNITED STATES PATENTS

| | | | |
|---|---|---|---|
| 268,614 | 12/1882 | Brown | 32—20 |
| 659,531 | 10/1900 | Johnson | 32—32 |
| 1,085,535 | 1/1914 | Brown | 32—20 |
| 1,674,088 | 6/1928 | Bodine | 32—20 |
| 2,275,726 | 3/1942 | Burns et al. | 32—32 |
| 2,456,447 | 12/1948 | Ringle et al. | 32—32 |
| 2,579,111 | 12/1951 | Fleischhacker | 32—20 |
| 2,959,857 | 11/1960 | Stoll | 32—32 |
| 3,052,030 | 9/1962 | Spence | 32—32 |
| 3,056,210 | 10/1962 | De Piedro | 33—174 |

RICHARD A. GAUDET, *Primary Examiner.*

J. W. HINEY, *Assistant Examiner.*